United States Patent
Moffett et al.

(10) Patent No.: US 8,409,647 B2
(45) Date of Patent: Apr. 2, 2013

(54) SILICA MICROGELS FOR REDUCING CHILL HAZE

(75) Inventors: Robert Harvey Moffett, Landenberg, PA (US); Jeffrey Allen Odle, Middletown, DE (US); Rafael Januario Calabrese, Sao Paulo (BR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 661 days.

(21) Appl. No.: 12/189,892

(22) Filed: Aug. 12, 2008

(65) Prior Publication Data

US 2010/0040747 A1    Feb. 18, 2010

(51) Int. Cl.
*A23L 1/059* (2006.01)
(52) U.S. Cl. .......... 426/423; 426/49; 426/422; 426/490; 426/592; 106/162.1; 435/41
(58) Field of Classification Search .................. None
See application file for complete search history.

(56) References Cited

U.S. PATENT DOCUMENTS

| | | | |
|---|---|---|---|
| 4,027,046 A | 5/1977 | Bohm et al. | |
| 4,109,017 A | 8/1978 | Grampp et al. | |
| 4,515,821 A | 5/1985 | Armstead et al. | |
| 4,631,193 A | 12/1986 | Sobus | |
| 4,636,394 A * | 1/1987 | Hsu | 426/330.4 |
| 4,684,530 A | 8/1987 | Welsh et al. | |
| 4,797,294 A | 1/1989 | Berg | |
| 4,820,420 A | 4/1989 | Hums et al. | |
| 4,880,650 A | 11/1989 | Okamura et al. | |
| 4,927,498 A | 5/1990 | Rushmere | |
| 4,954,220 A | 9/1990 | Rushmere | |
| 4,975,405 A | 12/1990 | Okamura et al. | |
| 5,127,994 A | 7/1992 | Johansson | |

(Continued)

FOREIGN PATENT DOCUMENTS

| | | |
|---|---|---|
| CA | 2272032 | 11/2000 |
| DE | 1160812 | 1/1964 |

(Continued)

OTHER PUBLICATIONS

Iler, R.K. The Chemistry of Silica. 1979. pp. 384-394. John Wiley and Sons.*

(Continued)

*Primary Examiner* — Helen F Heggestad
(74) *Attorney, Agent, or Firm* — Erik W. Perez

(57) ABSTRACT

The present invention provides a method of reducing chill haze in a protein containing liquid (especially beverages resulting from fermentation such as beer and wine) by contacting the liquid with silica microgels having an average microgel diameter of at least 18 nm, more preferably at least 45 nm, and most preferably at least 70 nm. It has now been discovered that microgels having an average microgel diameter of less than about 18 nm do not adequately reduce chill haze of a protein containing liquid. In particular, while microgels having an average microgel diameter of less than about 18 nm cause the coagulation of haze-forming components, these components remain suspended in liquid and continue to cause haze despite allowing the liquid to settle for long periods of time. Conversely, it has now been discovered that microgels having an average microgel diameter of at least about 18 nm cause the coagulation and precipitation of haze-forming components and the rapid settling thereof without the use of an organic polymer which acts as a flocculating agent.

10 Claims, 2 Drawing Sheets

U.S. PATENT DOCUMENTS

| | | | |
|---|---|---|---|
| 5,278,284 | A | 1/1994 | Lusk et al. |
| 5,279,807 | A | 1/1994 | Moffett et al. |
| 2,234,285 | A | 3/1994 | Schworm et al. |
| 5,482,693 | A | 1/1996 | Rushmere et al. |
| 5,622,743 | A | 4/1997 | Tanaka et al. |
| 5,626,721 | A | 5/1997 | Rushmere et al. |
| 6,060,523 | A | 5/2000 | Moffett et al. |
| 6,132,625 | A | 10/2000 | Moffett |
| 6,274,112 | B1 * | 8/2001 | Moffett et al. ............ 423/338 |
| 6,372,806 | B1 * | 4/2002 | Keiser et al. ............... 516/82 |
| 6,565,905 | B1 * | 5/2003 | Ito et al. ................. 426/330.4 |
| 6,712,974 | B1 | 3/2004 | Palm et al. |
| 7,048,859 | B1 | 5/2006 | Moffett |
| 7,153,534 | B2 | 12/2006 | Rehmanji et al. |
| 2003/0024671 | A1 | 2/2003 | Persson et al. |
| 2004/0055957 | A1 | 3/2004 | Palm et al. |
| 2005/0142258 | A1 | 6/2005 | Hu et al. |
| 2005/0229813 | A1 | 10/2005 | Dionisi et al. |

FOREIGN PATENT DOCUMENTS

| | | |
|---|---|---|
| DE | 1442338 | 6/1974 |
| DE | 279233 | 5/1990 |
| DE | 10000467 | 8/2001 |
| EP | 189657 | 3/1989 |
| EP | 491879 B1 | 6/1994 |
| EP | 502089 B1 | 6/1994 |
| GB | 887796 A * | 1/1962 |
| GB | 981715 | 1/1965 |
| GB | 2206891 | 1/1989 |
| JP | 58175473 | 10/1983 |
| JP | 60027376 | 2/1985 |
| JP | 02268676 | 11/1990 |
| JP | 05097421 | 4/1993 |
| JP | 10201463 | 8/1998 |
| JP | 10304865 | 11/1998 |
| WO | 0066705 | 11/2000 |
| WO | 02/057403 | 7/2002 |
| WO | 2005090611 | 9/2005 |

OTHER PUBLICATIONS

Freeman et al. Ch. 8: Filtration and Stabilization of Beers. In Fermented Beverage Production. Editors Lea, A. and Piggot J.R. 2003. pp. 365-368.*

Lewis, R.J. Hawley's Condensed Chemical Dictionary, 14th Edition. 2002. Wiley-Interscience.*

Iler, The Chemistry of Silica, 1979, pp. 174-176 and 225-234, Publisher, John Wiley and Sons, New York, USA.

Muto et al., 1955:54884, Elimination of Protein Turbidity and Hyochi Turbidity in Sake with Aluminum Silicate Gel, Journal of the Brewing Society of Japan, 1954, vol. 49, pp. 402-405 (Abstract Only).

Raible et al., 1983:159085, Silicic Acid Sol—A Beer Stabilizer for Improvement of the Filtration Properties of Beer, Monatsschrift fuer Brauerei, 1983, vol. 36, Issue 3, pp. 113-119 (Abstract Only).

Raible et al., 1983:214033, Silicic Acid Sol—A Beer Stabilizer for Improvement of the Filtration Properties of Beer, Monatsschrift fuer Brauwissenschaft, 1983, vol. 36, Issue 2, pp. 76-82 (Abstract Only).

Schmied et al., 1984:207820, Experiments on Protein Stabilization with Gulsenit-Stabil, Mitteilungen der Versuchsstation fuer das Gaerungsgwebe in Wien, 1984, vol. 38, Issues 1-2, pp. 8-10 (Abstract Only).

Irmscher, 1992:104539, Future-Oriented Beer Stabilization, Brauwelt, 1991, vol. 131, Issue 38, pp. 1625-1628 (Abstract Only).

Irmscher, B., 1993:558790, Forward-Looking Beer Stabilization, Cerevisia and Biotechnology, 1993, vol. 18, Issue 1, pp. 15-17 (Abstract Only).

Ito et al., 1993:537776, The Absorption of Proteins in Fermented Aqueous Food by Silica Gels, Colloids and Surfaces, A: Physiochemical and Engineering Aspects, 1993, vol. 74, Issue 1, pp. 107-113.

McMurrough et al., 1995:179663, Colloidal Stabilization of Lager Beer, Proceedings of the Congress—European Brewery Convention, 1993, 24th, pp. 663-672 (Abstract Only).

Guzman et al., 1999:453488, Selective Protein Absorption with Silica Gel, Technical Quarterly—Master Brewers Association of the Americas, 1999, vol. 36, Issue 2, pp. 227-230 (Abstract Only).

Rehmanji et al., 2000:868996, Superior Colloidal Stabilization of Beer by Combined Treatment with Silica (Xerogel) and PVPP, Polyclar Plus, Technical Quarterly—Master Brewers Association of the Americas, 2000, vol. 37, Issue 1, pp. 113-118 (Abstract Only).

Leiper et al., 2002:433847, Premixing of Isinglass and Silica Gel to Obtain Improved Beer Stability, Journal of the Institute of Brewing, 2002, vol. 108, Issue 1, pp. 28-31.

Leiper et al., 2005:1158244, Optimising Beer Stabilisation by the Selective Removal of Tannoids and Sensitive Proteins, Journal of the Institute of Brewing, 2005, vol. 111, Issue 2, pp. 118-127.

Dedtkaev et al., 2006:626379, Increasing Physiochemical Stability of Beer by Using Silica Gel and Polyvinylpolypyrrolidon (PVPP), Pivo i Napitki, 2006, vol. 2, pp. 26-29 (Abstract Only).

Moffett, XP 002040014, On-Site Production of a Silica-Based Microparticulate Retention and Drainage Aid, Tappi Journal, Technical Association of the Pulp & Paper Industry, Atlanta, GA, US, Dec. 1, 1994, vol. 77, No. 12, pp. 133-138.

* cited by examiner

SILICA MICROGELS FOR REDUCING CHILL HAZE

FIELD OF THE INVENTION

The present invention relates to a method of reducing chill haze in beverages. In particular, the invention relates to a method of using silica microgels to reduce chill haze in beverages made by fermentation, such as beer and wine.

BACKGROUND OF THE INVENTION

Fermented beverages, such as beer and wine, are complex solutions comprising various organic compounds such as haze-forming components that, upon aging and chilling to about 0° C., undergo undesirable reactions and destabilize the beverage to cause observable cloudiness ("chill haze") and reduced physical shelf life. Common chill haze-forming components are certain proteins and polyphenols derived from ingredients during the fermentation process such as malt or hops. Proteins, particularly those rich in proline and glutamic acid, can interact with polyphenols, particularly tannins, creating a cloudy product at low temperatures, close to 0° C.

Removal of haze-forming components has been accomplished by employing silica which selectively adsorbs and/or flocculates these components. For example, U.S. Pat. No. 4,027,046 describes a colloidal silica sol for reduction of haze having a surface area of from 50 to 600 m²/g. Another form of silica, known as silica microgels, has been proposed to remove haze-forming proteins from a liquid as disclosed in U.S. Pat. No. 7,048,859 but the silica microgels must be used in conjunction with an organic polymer which acts as a flocculating agent.

Despite the advances of using various forms of silica for removal of haze-forming components, there is still a need for a more efficient silica to reduce chill haze without the requirement of using an organic polymer which acts as a flocculating agent. This would be particularly desirable to avoid any undesirable interaction between treated fermentation liquid products and said organic polymer.

BRIEF SUMMARY OF THE INVENTION

The present invention provides a method of reducing chill haze in a protein containing liquid (especially beverages resulting from fermentation such as beer and wine) by contacting the liquid with a silica microgel solution having an average microgel diameter of at least 18 nm, more preferably at least 45 nm, and most preferably at least 70 nm. It has now been discovered that a silica microgel solution having an average microgel diameter of less than about 18 nm does not adequately reduce chill haze of a protein containing liquid. In particular, while a silica microgel solution having an average microgel diameter of less than about 18 nm causes the coagulation of haze-forming components, these components remain suspended in liquid, despite allowing the liquid to settle for long periods of time, and continue to cause haze. Conversely, it has now been discovered that a silica microgel solution having an average microgel diameter of at least about 18 nm causes the coagulation and precipitation of haze-forming components and the rapid settling thereof without the use of an organic polymer which acts as a flocculating agent.

In contrast to silica gels (e.g., hydrogels, xerogels, and others) which are typically provided in solid form, the silica microgels used in the present invention comprise agglomerated silica particles which are typically dispersed in at least 90 weight percent water, and preferably at least 98 percent weight percent water. Each silica microgel is an aggregate of nanometer sized primary silica particles (typically about 1-2 nm) that structurally form chains and three dimensional networks. Microgels useful in the invention are delivered as aqueous dispersions comprising between about 0.5 and 2 weight percent $SiO_2$, preferably about 1 weight percent $SiO_2$.

The silica microgels of the preset invention preferably have a surface area greater than 750 m²/g, more preferably greater than 900 m²/g, still more preferably greater than 1000 m²/g, and most preferably greater than 1100 m²/g. The higher surface area of silica microgels used in the invention provides more sites to conduct adsorption of proteins and other haze-forming components.

Useful forms of silica in the invention include a silica microgel which can further incorporate aluminum (i.e., aluminosilicate microgel). Silica microgels (also known as polysilicate microgels and active silicas) typically have $SiO_2$:$Na_2O$ ratio of 3:1 to about 25:1, and are described on pages 174-176 and 225-234 of "The Chemistry of Silica" by Ralph K. Iler, published by John Wiley and Sons, N.Y., 1979.

DETAILED DESCRIPTION OF THE INVENTION

Figure 1:
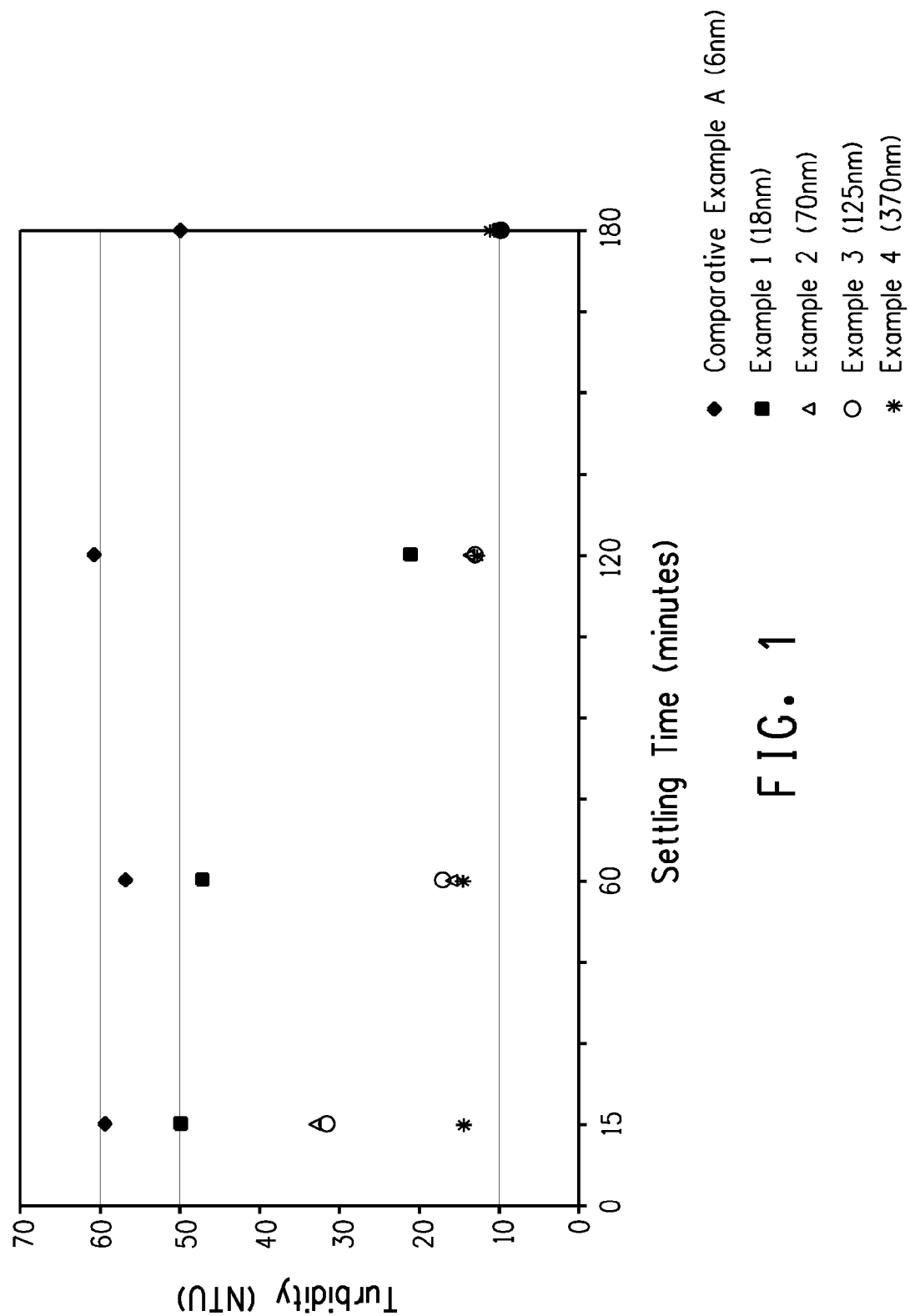
FIG. 1 and FIG. 2 depict a graph plotting turbidity as a function of settling time for silica microgels having differently sized average diameters.

The silica microgels and aluminosilicate microgels useful in this invention are typically formed by the activation of an alkali metal silicate under conditions described in U.S. Pat. Nos. 4,954,220; 4,927,498; and 5,279,807; all of which are incorporated herein by reference to the extent permissible by applicable law. However, other methods can also be employed. For example, polyaluminosilicates can be formed by the acidification of silicate with mineral acids containing dissolved aluminum salts as described in U.S. Pat. No. 5,482,693, incorporated herein by reference to the extent permissible by applicable law. Aluminosilicate microgels can be formed by the acidification of silicate with an excess of alum, as described in U.S. Pat. No. 2,234,285, incorporated herein by reference to the extent permissible by applicable law.

The silica microgels used in the present invention may be generally made by adding an acid or a base to a water soluble silicate solution thereby initiating polymerization of the silica and creating a gelating mixture. The gelating mixture is then allowed to age for a period of time ("age time") to achieve a desired level of microgel formation. The term "age time" refers to the time allowed for individual silica particles (typically from 1-2 nm in diameter) to form aggregates (called "microgels") which comprise the silica particles arranged in three dimensional networks and chains. The size of these microgels can be controlled by choosing an appropriate age time. Longer age times yield larger sized microgels while shorter age times yield smaller sized microgels In the invention, age time is chosen to yield a silica microgel solution having an average microgel diameter at least about 18 nm, preferably at least about 45 nm, and more preferably at least about 70 nm. Still more preferably, age time is chosen to yield a silica microgel solution having an average microgel diameter not more than about 1,000 nm. A silica microgel solution with these average microgel diameters has now been discovered to efficiently reduce chill haze by generating precipitates of chill haze-forming proteins which rapidly settle out of solution without the need of an organic polymer that acts as a flocculating agent. In addition to increasing age time, microgel size can also be increased by changing pH, changing concentrations, or other methods known to those skilled in the art. In general, an age time useful for making microgels useful in the present invention is typically at least about 10 seconds but not more than about 15 minutes. After the desired age time has elapsed, continued gelation is prevented by dilution to a silica concentration typically not greater than about 1 wt. % and adjusting the pH to an appropriate level, typically less than 3 or greater than 9.

Silica microgel solutions useful in the invention are commercially available, such as PARTICLEAR manufactured by E.I. du Pont de Nemours and Company of Wilmington Del., and are produced by methods known in the art. For example, U.S. Pat. No. 6,060,523 and U.S. Pat. No. 6,274,112 disclose enhanced processes allowing reliable preparation of silica microgel solutions.

Reduction of chill haze in a protein containing liquid (especially liquids resulting from fermentation) can be accomplished by contacting the liquid with a silica microgel solution of the present invention having an average microgel diameter of at least about 18 nm, more preferably at least about 45 nm, and most preferably at least about 70 nm. Because microgels with these average microgel diameters efficiently reduce chill haze by generating precipitates of chill haze-forming proteins which rapidly settle out of solution, the invention is preferably practiced without the use of an organic polymer that acts as a flocculating agent. Specific organic polymers capable of acting as flocculating agents that are preferably excluded from the invention are cationic polymers, amphoteric polymers, and mixtures thereof. Such polymers typically have a number average molecular weight of greater than about 1,000,000. Examples of cationic polymers capable of acting as flocculating agents that are preferably excluded from the invention are those derived from biological sources such as cationic starch, cationic guar gum, and chitosan. Further examples of cationic polymers capable of acting as flocculating agents that are preferably excluded from the invention are those synthetically derived such as cationic polyacrylamide. Examples of amphoteric polymers capable of acting as flocculating agents that are preferably excluded from the invention are amphoteric starch, amphoteric guar gum and synthetic amphoteric organic polymers. Furthermore, the invention preferably excludes the use of any organic polymer capable of acting as a flocculating agent which is disclosed in U.S. Pat. No. 7,048,859 (hereby incorporated by reference to the extent permissible by applicable law).

In one embodiment, the present invention preferably excludes any step of contacting the liquid with an organic polymer having a number average molecular weight of greater than about 1,000,000, wherein said polymer is capable of acting as a flocculating agent. In another embodiment, the present invention preferably excludes any step of contacting the liquid with an organic polymer having a number average molecular weight of greater than about 800,000, wherein said polymer capable of acting as a flocculating agent.

The silica microgel solution of the present invention is added in sufficient amounts and contacted for a sufficient amount of time with a protein containing liquid so that the silica microgel causes the haze-forming components of the liquid to coagulate and precipitate and rapidly settle out of liquid suspension thereby clarifying the liquid and reducing haze. The precipitated haze-forming components can then be separated with the silica microgel via decantation, centrifugation, whirlpool, filtering, or other separation processes. The amount of silica added is preferably from about 1 to 1000 ppm, more preferably from about 5 to 500 ppm, and most preferably from about 10 to 250 ppm. The silica is contacted with the liquid for an amount of time longer than about 5 minutes, preferably longer than about 10 minutes, and most preferably longer than about 30 minutes.

The silica microgel solutions of the invention are particularly suitable for use in a typical brewing process which involves malt grinding, mashing, mash filtration, wort boiling, and fermentation, cold conditioning, and final filtering. Malt is made by allowing a grain (typically barley, wheat, or rye) to germinate, after which it is then dried in a kiln and sometimes roasted. During malt grinding, grist is created when the malt is crushed to break apart the grain kernels, increase their surface area, and separate the smaller pieces from the husks. During mashing, grist is mixed with heated water and other optional cereals for a period of time (typically 1-2 hours) and at varying temperatures to allow natural enzymes within the malt break to down the starch therein into sugars suitable for fermentation. The mash is then optionally allowed to rest at a temperature (typically 49° C. to 55° C.) and length of time which activates various proteinases that break down some of the proteins that cause haziness.

During mash filtration, the mash is filtered resulting in a liquid known as wort. During wort boiling, the wort is boiled with hops, and sometimes other ingredients such as herbs or sugars, in a manner which, among other things, terminates enzymatic processes, isomerizes bitter hop resins, and concentrates and sterilizes the wort. After solids removal by decantation, centrifugation, or by whirlpool, the wort is cooled to a fermentation temperature, oxygenated, and pitched with yeast. Then during fermentation, "green" beer is created when yeast converts fermentable carbohydrates into ethanol, carbon dioxide, and other compounds. After fermentation, the green beer is chilled just above freezing in a process known as cold conditioning which initiates chill haze where haze-forming precursors, such as proteins and tannins, precipitate from solution. To remove yeast and other sediments, the beer is subjected to final filtering preferably maintaining the temperature of cold conditioning to prevent haze-forming precursors from re-solubilizing and remaining unfiltered thereby potentially causing haze and reduced shelf life in the filtered product.

The silica microgel solution of the present invention is added in sufficient amount and contacted for a sufficient amount of time with liquid in the brewing process so that the silica microgel causes the haze-forming components of the liquid to coagulate and precipitate and rapidly settle out of liquid suspension thereby clarifying the liquid and reducing haze. The precipitated haze-forming components can then be separated with the silica microgel via decantation, centrifugation, whirlpool, filtering, or other separation process. The silica microgel solution can be added during wort boiling prior to fermentation or preferably during cold conditioning after fermentation. The amount of silica added is preferably from about 1 to 1000 ppm, more preferably from about 5 to 500 ppm, and most preferably from about 10 to 250 ppm. The silica is contacted with the liquid for an amount of time longer than about 5 minutes, preferably longer than about 10 minutes, and most preferably longer than about 30 minutes.

Having described the invention, it now will be illustrated, but not unduly limited, by the following examples.

EXAMPLES

Silica Microgel Solution

All of the silica microgel solutions in the Examples below were made according to the following procedure. A sodium silicate solution having a $SiO_2$:$Na_2O$ ratio of 3.22:1 was obtained. The sodium silicate solution was diluted to 2.1 wt % $SiO_2$ with deionized water. A mixture was made by adding 10 mL of 5N sulfuric to 281 grams of the diluted sodium silicate solution and microgel formation by gelation was allowed to occur. Five aliquots of the mixture were removed at various lengths of time during gelation. After the removal of each aliquot, microgel growth (i.e., aggregation) was arrested by immediately diluting the aliquot to 1 wt. % $SiO_2$ with deionized water and further acidified with sulfuric acid to a pH of 2. The five aliquots produced silica microgel solutions respectively having five different average microgel diameters: 6 nm, 18 nm, 70 nm, 125 nm, and 370 nm.

Average microgel diameters were determined by first determining the viscosity of each aliquot with a Cannon Fenske size 50 viscometer tube. Average microgel size (diameter in nm) was then estimated by comparing these viscosity measurements with viscosity measurements of a series of silica microgel solutions for which particle sizes were measured using dynamic light scattering analysis. Dynamic light scattering analysis was performed using a Brookhaven Instrument light scattering goniometer, model BI-200SM. Measurements of the microgels were conducted at room temperature using an argon-ion laser with a wavelength of 488 nm operating at 200 mW power. Light scattering intensity measurements were made at different angles and the data were analyzed using a Zimm plot.

Turbidity Measurements

Turbidity is a unit of measurement quantifying the degree to which light traveling through a water column is scattered by suspended particles and is typically reported in Nephelometric Turbidity Units (NTU). The scattering of light increases with a greater amount of suspended particles. Turbidity of the beers in all of the examples below was measured with a HACH 2100N turbidity meter (nephelometer) available from Hach Company, Loveland, Colo., which reported turbidity in units of NTU. A high turbidity measurement was indicative of high levels of haze-forming components suspended in the beer. The decrease in measured turbidity after the beer was allowed to settle and/or filtered was indicative of the amount of clarification, i.e., the reduction in the amount of haze-forming components.

Filtering

Filtering in all of the examples below was performed with a #1 WHATMAN filter paper and a filter flask.

Beer #1

Beer #1 used in the Examples was a sample obtained from a brewery after cold conditioning but prior to filtration (i.e., "green beer").

Beer #2

Beer #2 used in the Examples was a different sample from Beer #1 and was also obtained from a brewery after cold conditioning but prior to filtration.

Turbidity of Beer #1 and Beer #2

The turbidity of untreated Beer #1 was 74.9 NTU at 4° C. After untreated Beer #1 was filtered, it had a turbidity of 21.0 NTU at 4° C. The turbidity of untreated Beer #2 was 108 NTU at 4° C. After untreated Beer #2 was filtered, it had a turbidity of 47.4 NTU at 4° C.

Comparative Example A

A mixture was made by adding a silica microgel solution having an average microgel diameter of 6 nm to an aliquot of Beer #1 such that 50 ppm silica was added. After stirring, the mixture was allowed to settle for a total of 180 minutes. At intervals of 15 minutes, 60 minutes, 120 minutes, and 180 minutes an aliquot of the clarified liquid above the settled mixture was removed and its turbidity was measured and measured again after filtering. The turbidity measurements are shown in Table #1.

Example 1

Comparative Example A was duplicated except a silica microgel solution having an average microgel diameter of 18 nm was used instead of an average microgel diameter of 6 nm. The turbidity measurements are shown in Table #1 below.

Example 2

Comparative Example A was duplicated except a silica microgel solution having an average microgel diameter of 70 nm was used instead of an average microgel diameter of 6 nm. The turbidity measurements are shown in Table #1 below.

Example 3

Comparative Example A was duplicated except a silica microgel solution having an average microgel diameter of 125 nm was used instead of an average microgel diameter of 6 nm. The turbidity measurements are shown in Table #1 below.

Example 4

Comparative Example A was duplicated except a silica microgel solution having an average microgel diameter of 370 nm was used instead of an average microgel diameter of 6 nm. The turbidity measurements are shown in Table #1 below.

Comparative Example B

A mixture was made by adding a silica microgel solution having an average microgel diameter of 6 nm to an aliquot of Beer #2 such that 150 ppm silica was added. After stirring, the mixture was allowed to settle for a total of 120 minutes. At intervals of 15 minutes, 60 minutes, and 120 an aliquot of the clarified liquid above the settled mixture was removed and its turbidity was measured and measured again after filtering. The turbidity measurements are shown in Table #1 below.

Example 5

Comparative Example B was duplicated except a silica microgel solution having an average microgel diameter of 18 nm was used instead of an average microgel diameter of 6 nm. The turbidity measurements are shown in Table #1 below.

Example 6

Comparative Example B was duplicated except a silica microgel solution having an average microgel diameter of 125 nm was used instead of an average microgel diameter of 6 nm. The turbidity measurements are shown in Table #1 below.

TABLE #1

|  | Example | Microgel Average Diameter (nm) | 15 min. of Settling | | 60 min. of Settling | | 120 min. of Settling | | 180 min. of Settling | |
|---|---|---|---|---|---|---|---|---|---|---|
|  |  |  | Turbidity After Settling Only (NTU) | Turbidity After Settling and Filtration (NTU) | Turbidity After Settling Only (NTU) | Turbidity After Settling and Filtration (NTU) | Turbidity After Settling Only (NTU) | Turbidity After Settling and Filtration (NTU) | Turbidity After Settling Only (NTU) | Turbidity After Settling and Filtration (NTU) |
| Beer #1 | A | 6 | 109 | 59.7 | 85.2 | 57.7 | 83.7 | 60.5 | 72.2 | 49.9 |
| and | 1 | 18 | 81.4 | 49.9 | 67.3 | 48.3 | 28.8 | 21.0 | 14.1 | 10.4 |
| 50 ppm | 2 | 70 | 55.1 | 33.1 | 26.4 | 15.4 | 19.2 | 14.2 | 13.6 | 10.3 |
| Microgel | 3 | 125 | 54.3 | 31.4 | 25.6 | 17.6 | 17.6 | 12.3 | 13.7 | 9.8 |
|  | 4 | 370 | 22.1 | 15.0 | 21.6 | 14.4 | 18.0 | 12.6 | 16.3 | 11.4 |
| Beer #2 | B | 6 | 125 | 78.3 | 85.2 | 56.8 | 40.0 | 23.2 |  |  |
| and | 5 | 18 | 112 | 63.8 | 28.6 | 22.0 | 14.3 | 10.3 |  |  |
| 150 ppm Microgel | 6 | 125 | 30.1 | 20.1 | 21.6 | 14.6 | 14.4 | 10.2 |  |  |

As shown by Table 1, Comparative Example A, the turbidity of Beer #1 increased to 109 NTU after addition of a silica microgel solution having an average microgel diameter of 6 nm and settling for 15 minutes. This increase in turbidity was caused by the silica microgel effecting the coagulation of haze-forming components (such as proteins). However, this coagulum remained suspended in the beer after 15 minutes of settling as evidenced by the high-turbidity measurement of 109 NTU. Even after the beer was allowed to settle for 60 minutes, most of the coagulated haze-forming components were still suspended in the beer as evidenced by the high turbidity measurement of 85.2. After the beer was allowed to settle for even longer periods of time, there was little change in turbidity (83.7 at 120 minutes; and 72.2 at 180 minutes) indicating that a large portion of the coagulated haze-forming components were still suspended in the beer rather than precipitated.

In Example 1, which duplicated Comparative Example A but instead used a silica microgel solution having a higher average microgel diameter (18 nm), a much smaller portion of the coagulated haze-forming components remain suspended in the beer after 15 minutes of settling as evidenced by a turbidity measurement of 81.4 NTU compared with 109 NTU of Comparative Example A. When the beer in Example 1 was allowed to settle for longer periods of time, the portion of the coagulated haze forming components suspended in the beer rapidly decreased as evidenced by turbidity measurements of: 67.3 NTU after 60 minutes; 28.8 NTU after 120 minutes; and 14.1 NTU after 180 minutes. This rapid decrease of suspended haze forming components upon settling was not observed in the beer of Comparative Example A which used a silica microgel solution having an average microgel diameter less than 18 nm. Accordingly, it was demonstrated that a silica microgel solution having an average microgel diameter of at least 18 nm is necessary to effect rapid clarification.

The conditions of Comparative Example A and Example 1 were duplicated in Examples 2-4 except that a silica microgel solution having successively higher average microgel diameter was used: Example 2 used an average microgel diameter of 70 nm; Example 3 used an average microgel diameter of 125 nm; and Example 4 used an average microgel diameter of 370 nm. These examples show that when average microgel diameter is increased, the rapidity of clarification is also increased. This is more clearly shown in FIG. 1 which plots settling time versus turbidity (with no filtering) for Comparative Example A and Examples 1-4. The data points for Example A (6 nm diameter) create a very gradual slope which indicates very slow clarification over time. A much steeper slope is created by the data points of Example 1 (18 nm diameter) which indicates rapid clarification over time. An even more steeper slope is created by the data points of Example 2 (70 nm diameter) which indicates an even more rapid clarification over time. A still even more steeper slope is created by the data points of Examples 3-4 (125 nm and 370 nm diameters) which indicates a still even more rapid clarification over time.

As shown by Table 1, Comparative Example B, the turbidity of Beer #2 increased to 125 NTU after addition of a silica microgel solution having an average microgel diameter of 6 nm and settling for 15 minutes. This increase in turbidity was caused by the silica microgel effecting the coagulation of haze forming components (such as proteins). However, this coagulum remained suspended in the beer after 15 minutes of settling as evidenced by the high turbidity measurement of 125 NTU. Even after the beer was allowed to settle for 60 minutes, most of the coagulated haze forming components were still suspended in the beer as evidenced by the high turbidity measurement of 85.2. After the beer was allowed to settle for 120 minutes there was comparatively little change in turbidity indicating that a large portion of the coagulated haze forming components were still suspended in the beer rather than settled.

In Example 5, which duplicated Comparative Example B but instead used a silica microgel solution having a higher average microgel diameter (18 nm), a much smaller portion of the coagulated haze forming components remain suspended in the beer after 15 minutes of settling as evidenced by a turbidity measurement of 112 NTU compared with 125 NTU of Comparative Example B. When the beer in Example 5 was allowed to settle for longer periods of time, the portion of the coagulated haze forming components suspended in the beer rapidly decreased as evidenced by turbidity measurements of: 28.6 NTU after 60 minutes; and 14.3 NTU after 120 minutes. This rapid decrease of suspended haze forming components upon settling was not observed in the beer of Comparative Example B which used a silica microgel solution having an average microgel diameter less than 18 nm. Accordingly, it was demonstrated that a silica microgel solution having an average microgel diameter of at least 18 nm is necessary to effect rapid clarification without a high molecular weight (average molecular weight higher than 800,000 or 1,000,000) flocculant.

Figure 2:
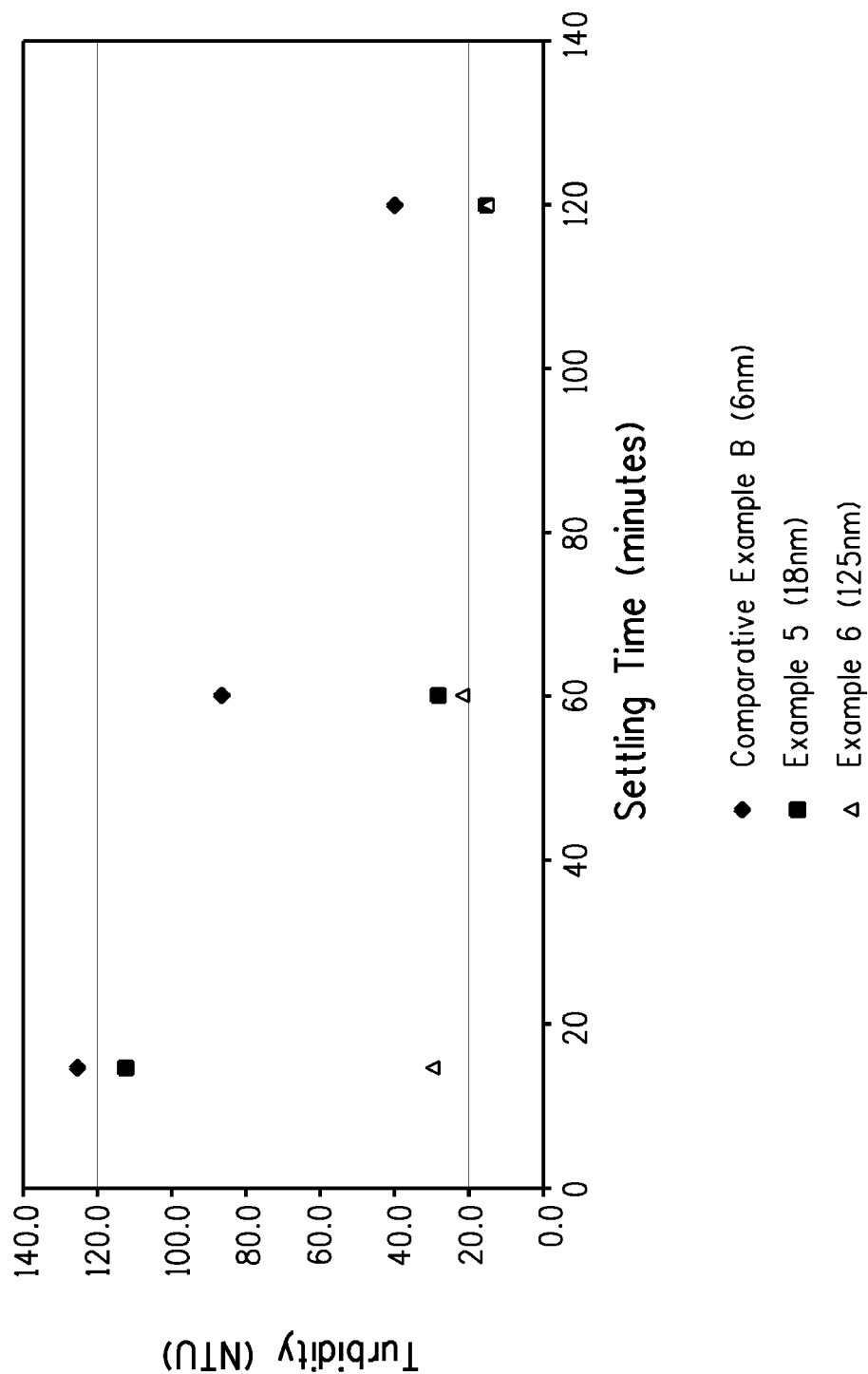

The conditions of Comparative Example B and Example 5 were duplicated in Example 6 except that a silica microgel having a higher average microgel diameter (125 nm) was used. Example 6 shows that when average microgel diameter is increased, the rapidity of clarification is also increased. This is more clearly shown in FIG. 2 which plots settling time versus turbidity (with no filtering) for Comparative Example B and Examples 5 and 6. The data points for Example B (6 nm diameter) create a very gradual slope which indicates very slow clarification over time. A much steeper slope is created by the data points of Example 5 (18 nm diameter) which indicates rapid clarification over time. An even more steeper slope is created by the data points of Example 6 (125 nm diameter) which indicates an even more rapid clarification over time.

diameter is increased, the rapidity of clarification is also increased as indicated by Table 2 which shows increasingly higher reductions in turbidity when higher average microgel diameters are added to the green beer and allowed to settle for 15 minutes.

In all of the examples above, no organic polymer capable of acting as a flocculating agent was used. Thus the examples demonstrate that microgels with suitable average microgel diameters (e.g., >about 18 nm, >about 45 nm, or greater than >about 70 nm) efficiently reduce chill haze by generating precipitates of chill haze forming proteins which rapidly settle out of solution without using an organic polymer that acts as a flocculating agent.

TABLE #2

| | Example | Microgel Average Diameter (nm) | 15 min. of Settling Percent Reduction of Turbidity* | 60 min. of Settling Percent Reduction of Turbidity* | 120 min. of Settling Percent Reduction of Turbidity* | 180 min. of Settling Percent Reduction of Turbidity* |
|---|---|---|---|---|---|---|
| Beer #1 | A | 6 | ** | ** | ** | 3.6 |
| and | 1 | 18 | ** | 10.1 | 61.5 | 81.2 |
| 50 ppm | 2 | 70 | 26.4 | 64.8 | 74.4 | 81.8 |
| Microgel | 3 | 125 | 27.5 | 65.8 | 76.5 | 81.7 |
| | 4 | 370 | 70.5 | 71.2 | 76.0 | 78.2 |
| Beer #2 | B | 6 | ** | 21.1 | 63.0 | |
| and | 5 | 18 | ** | 73.5 | 86.8 | |
| 150 ppm Microgel | 6 | 125 | 72.1 | 69.6 | 78.4 | |

*Percent reduction of turbidity is calculated by [(initial turbidity of the green beer) − (turbidity after settling only)] ÷ (initial turbidity of the green beer) × 100
**Indicates no reduction in turbidity.

As shown by Table 2, Comparative Example A, there was no reduction in turbidity after addition of a silica microgel solution having an average microgel diameter of 6 nm and settling for 15 minutes. There was no reduction in turbidity even after the beer was allowed to settle for 60 minutes or for 120 minutes, and only a 3.6 percent reduction of turbidity after 180 minutes.

In Example 1, which duplicated Comparative Example A but instead used a silica microgel solution having a higher average microgel diameter (18 nm), there was no reduction of turbidity after 15 minutes but after 60 minutes there was a 10.1 percent reduction of turbidity compared with no reduction of turbidity for Example A. At 120 and 180 minutes, recent reduction of turbidity in Example 1 jumped to 61.5 and 81.2 compared with very little no reduction of turbidity in Example A. Accordingly, it was demonstrated that a silica microgel solution having an average microgel diameter of at least 18 nm is necessary to effect rapid clarification.

The conditions of Comparative Example A and Example 1 were duplicated in Examples 2-4 except that silica microgel solutions having successively higher average microgel diameter was used: Example 2 used an average microgel diameter of 70 nm; Example 3 used an average microgel diameter of 125 nm; and Example 4 used an average microgel diameter of 370 nm. These examples show that when average microgel thereby causing the coagulation and precipitation of haze-forming components.

2. The method of claim 1 wherein the average diameter of the silica microgels is at least about 45 nm.

3. The method of claim 1 wherein each silica microgel is an aggregate of nanometer sized primary silica particles.

4. The method of claim 3 wherein the primary silica particles are about 1 nm to 2 nm.

5. The method of claim 1 wherein the aqueous dispersion comprises at least 98 weight percent water.

6. The method of claim 1 wherein the aqueous dispersion comprises between about 0.5 and 2 weight percent $SiO_2$ attributable to the microgels.

7. The method of claim 1 wherein the silica microgels have a surface area greater than 750 $m^2/g$.

8. The method of claim 1 wherein the microgels comprise $SiO_2$ and $Na_2O$.

9. The method of claim 8 wherein the microgels are made from a sodium silicate solution and the microgels have a $SiO_2$: $Na_2O$ ratio of from about 3:1 to about 25:1.

10. The method of claim 1 wherein the liquid is beer and the microgels are contacted with the beer after cold conditioning but before final filtration of the beer.

What is claimed is:

1. A method for reducing chill haze in a liquid comprising a protein, the method consisting essentially of contacting the liquid with an aqueous dispersion of silica microgels having an average diameter of at least about 18 nm to 1000 nm

* * * * *